(12) United States Patent
Li

(10) Patent No.: US 10,976,631 B2
(45) Date of Patent: Apr. 13, 2021

(54) SWITCHABLE DIFFUSER, METHOD FOR MANUFACTURING THE SAME, BACKLIGHT MODULE AND DISPLAY DEVICE

(71) Applicants: Beijing BOE Technology Development Co., Ltd., Beijing (CN); BOE TECHNOLOGY GROUP CO., LTD., Beijing (CN)

(72) Inventor: Wenbo Li, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/941,397

(22) Filed: Jul. 28, 2020

(65) Prior Publication Data

US 2021/0080764 A1 Mar. 18, 2021

(30) Foreign Application Priority Data

Sep. 18, 2019 (CN) .......................... 201910882226.1

(51) Int. Cl.
| | | |
|---|---|---|
| *G02F 1/13* | (2006.01) | |
| *G02F 1/1334* | (2006.01) | |
| *G02F 1/13357* | (2006.01) | |
| *G02F 1/1339* | (2006.01) | |
| *G02F 1/1347* | (2006.01) | |
| *G02F 1/137* | (2006.01) | |
| *F21V 8/00* | (2006.01) | |
| *G02F 1/1341* | (2006.01) | |

(52) U.S. Cl.
CPC .......... *G02F 1/137* (2013.01); *G02B 6/0051* (2013.01); *G02F 1/1334* (2013.01); *G02F 1/1341* (2013.01); *G02F 2202/36* (2013.01)

(58) Field of Classification Search
CPC ...... G02F 1/137; G02F 1/1341; G02F 1/1334; G02F 2202/36; G02B 6/0051
See application file for complete search history.

(56) References Cited

U.S. PATENT DOCUMENTS 9,448,414 B2 * 9/2016 Yoon ..................... G02F 1/1393
10,330,853 B2 * 6/2019 Zhu ...................... G02B 6/0038
(Continued)

*Primary Examiner* — Tracie Y Green
(74) *Attorney, Agent, or Firm* — McCoy Russell LLP

(57) ABSTRACT

A switchable diffuser is provided and includes: a first substrate; a second substrate; a first driving electrode on the first substrate; a second driving electrode on the second substrate; a polymer dispersed liquid crystal film between the first and second driving electrodes. The polymer dispersed liquid crystal film is made of a polymer dispersed liquid crystal composition via polymerizing and curing; the polymer dispersed liquid crystal composition includes: polymerized monomer, photoinitiator, spacer particles, nano scattering particles and liquid crystal. In the polymer dispersed liquid crystal composition, a percentage of the polymerized monomer is 5 wt %~30 wt %, a percentage of the photoinitiator is 0.05 wt % to 3 wt %, a percentage of the spacer particles is 0.8 wt % to 2 wt %, a diameter of the spacer particles is in a range of 10 micrometers to 50 micrometers, a percentage of the nano scattering particles is 0.1 wt % to 2 wt %, a percentage of the liquid crystal is 69 wt % to 90 wt %.

20 Claims, 3 Drawing Sheets

(56) References Cited

U.S. PATENT DOCUMENTS

| | | | |
|---|---|---|---|
| 10,553,002 B2* | 2/2020 | Armstrong-Muntner | ................... G03B 11/00 |
| 10,598,948 B2* | 3/2020 | Yu | ......................... H04N 13/395 |
| 2007/0024822 A1* | 2/2007 | Cortenraad | ............. G09F 13/22 353/79 |
| 2019/0278115 A1* | 9/2019 | Khan | ................... C09K 19/544 |

* cited by examiner

SWITCHABLE DIFFUSER, METHOD FOR MANUFACTURING THE SAME, BACKLIGHT MODULE AND DISPLAY DEVICE

CROSS-REFERENCE TO RELATED APPLICATION

The present application claims the priority to Chinese Application No. 201910882226.1, filed on Sep. 18, 2019. The entire contents of the above-listed application is hereby incorporated by reference for all purposes.

TECHNICAL FIELD

The present disclosure relates to the field of display technologies, and in particular to a switchable diffuser and a method for manufacturing the same, a backlight module and a display device.

BACKGROUND

Anti-peeping techniques in the related art include glasses-type technique and naked-eye technique. The glasses-type technique separates and protects confidential information through an external auxiliary device (such as auxiliary glasses). The naked-eye technique realizes anti-peeping by controlling angles of incident light. When an anti-peeping film and a switchable diffuser are set in a display device, the switch between anti-peeping display and normal display can be realized. However, the performance of the switchable diffuser in the related art still needs to be further improved.

SUMMARY

One embodiment of the present disclosure provides a switchable diffuser including: a first substrate; a second substrate disposed opposite to the first substrate; a first driving electrode disposed on an inner surface of the first substrate; a second driving electrode disposed on an inner surface of the second substrate; and a polymer dispersed liquid crystal film disposed between the first driving electrode and the second driving electrode. The polymer dispersed liquid crystal film is made of a polymer dispersed liquid crystal composition via polymerizing and curing; the polymer dispersed liquid crystal composition includes: polymerized monomer, photoinitiator, spacer particles, nano scattering particles and liquid crystal; a percentage of the polymerized monomer in the polymer dispersed liquid crystal composition is about 5 wt %~30 wt %; a percentage of the photoinitiator in the polymer dispersed liquid crystal composition is about 0.05 wt % to 3 wt %; a percentage of the spacer particles in the polymer dispersed liquid crystal composition is about 0.8 wt % to 2 wt %; a diameter of the spacer particles is in a range of 10 micrometers to 50 micrometers; a percentage of the nano scattering particles in the polymer dispersed liquid crystal composition is about 0.1 wt % to 2 wt %; a percentage of the liquid crystal in the polymer dispersed liquid crystal composition is about 69 wt % to 90 wt %.

Optionally, a diameter of the spacer particles is in a range of 11 micrometers to 20 micrometers.

Optionally, the nano scattering particles include silica nanoparticles.

Optionally, a clearing point of the liquid crystal is greater than or equal to 70° C.

Optionally, the percentage of the polymerized monomer in the polymer dispersed liquid crystal composition is 5 wt % to 10 wt %.

Optionally, the switchable diffuser includes a first preset region and a second preset region; in the first preset region, only the first driving electrode and the first substrate are reserved for connecting to a power supply; in the second preset region, only the second driving electrode and the second substrate are reserved for connecting to the power supply; the first preset region and the second preset region are located at an identical side of the switchable diffuser.

One embodiment of the present disclosure provides a method for manufacturing a switchable diffuser, including: mixing 5 wt % to 30 wt % polymerized monomer, 0.05 wt % to 3 wt % photoinitiator, 0.05 wt % to 2 wt % nano scattering particles, 0.8 wt % to 2 wt % spacer particles, and 69 wt % to 90 wt % liquid crystal, thereby obtaining a mixture; wherein a diameter of the spacer particles is in a ragneg of 10 microns to 50 microns; squeezing the mixture between a first substrate provided with a first driving electrode and a second substrate provided with a second driving electrode, and curing the mixture by irradiating ultraviolet light to the mixture, thereby forming the switchable diffuser.

Optionally, the method further includes: using a laser to cut the second substrate and the second driving electrode in a first preset region to remove a polymer dispersed liquid crystal film in the first preset region and expose the first driving electrode in the first preset region; using a laser to cut the first substrate and the first driving electrode in a second preset region to remove a polymer dispersed liquid crystal film in the second preset region and expose the second driving electrode in the second preset region; wherein the first preset region and the second preset region are located at an identical side of the switchable diffuser.

One embodiment of the present disclosure provides a backlight module including: a backlight, a light directing film and the above switchable diffuser. The backlight, the light directing film and the switchable diffuser are arranged in sequence.

Optionally, the light directing film is located between the backlight and the switchable diffuser.

Optionally, the backlight includes a light guide plate; the light directing film is disposed on the light guide plate.

One embodiment of the present disclosure provides a display device including: a display panel and the above backlight module. The display panel is disposed at a light emitting side of the backlight module.

Optionally, the first driving electrode and the second driving electrode of the switchable diffuser in the backlight module are connected to a flexible circuit board; the display device further includes a power management unit; the flexible circuit board and the backlight are connected to the power management unit.

Optionally, the display device further includes an alternating current power supply; the first driving electrode and the second driving electrode of the switchable diffuser in the backlight module are connected to the alternating current power supply.

BRIEF DESCRIPTION OF THE DRAWINGS

By reading the detailed description of optional embodiments below, various other advantages and benefits will become clear to those of ordinary skill in the art. The drawings are only for the purpose of showing the optional embodiments, and are not considered as limitations to the present disclosure. Throughout the drawings, the same reference symbols are used to denote the same parts.

Figure 1:
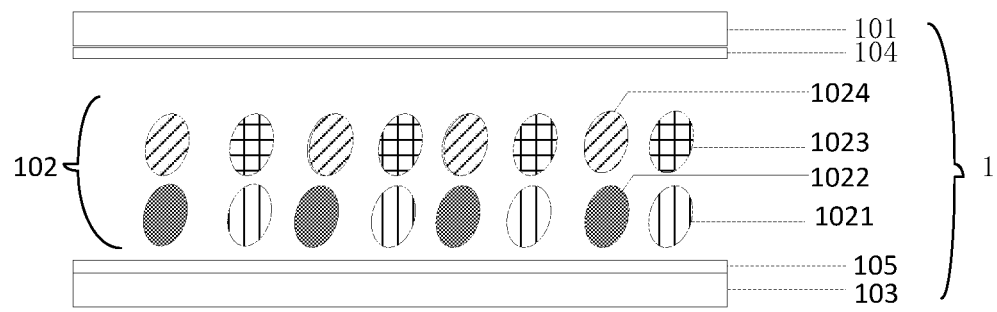
FIG. 1 is a schematic view of a switchable diffuser according to an embodiment of the present disclosure.

REFERENCE NUMERALS 101 first substrate
102 polymer dispersed liquid crystal film
103 second substrate
1021 spacer particle
1022 nano scattering particle
1023 polymerized monomer
1024 liquid crystal material
104 first driving electrode
105 second driving electrode
106 first preset region
107 second preset region
1 switchable diffuser
2 light directing film
3 backlight
4 alternating current power supply
5 flexible circuit board
6 power management unit
7 display panel

DETAILED DESCRIPTION

The technical solutions in the embodiments of the present disclosure will be described hereinafter in a clear and complete manner in conjunction with the drawings in the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

When an anti-peeping film and a switchable diffuser are set in a display device, the switch between anti-peeping display and normal display can be realized. In the related art, 3M anti-peeping film adopts ultra-fine shutter optical technology, so that displayed information is exclusively for users in front to read, and anyone watching on two sides can only see a dark screen. Further, the 3M anti-peeping film in combination with other auxiliary device such as a switchable diffuser, can realize switch between a narrow viewing angle and a wide viewing angle, i.e., switch between anti-peeping display and normal display.

A switchable diffuser made of polymer dispersed liquid crystal is usually arranged between a backlight module and a display panel. A higher driving voltage is required to switch states of the switchable diffuser. Further, heat dissipation of the backlight module also increases a temperature of the switchable diffuser, which adversely affects the performance of the switchable diffuser.

In view of this, embodiments of the present disclosure provide a switchable diffuser and a method for manufacturing the same, a backlight module and a display device. The switchable diffuser can cooperate with a light directing film to realize the switch between narrow viewing angle and wide viewing angle. Further, the switchable diffuser has a lower content of polymerized monomer, and is added with small-diameter spacer particles and nano-scattering particles, thereby reducing a driving voltage requiring for switching states of the switchable diffuser.

FIG. 1 is a schematic view of a switchable diffuser according to an embodiment of the present disclosure. Referring to FIG. 1, a switchable diffuser 1 includes a first substrate 101, a second substrate 103 disposed opposite to the first substrate 101, a first driving electrode 104 disposed on an inner surface of the first substrate 101, a second driving electrode 105 disposed on an inner surface of the second substrate 103, and a polymer dispersed liquid crystal film 102 disposed between the first driving electrode 104 and the second driving electrode 105. The polymer dispersed liquid crystal film 102 is made by polymerizing and curing a polymer dispersed liquid crystal composition. The polymer dispersed liquid crystal composition includes: polymerized monomer 1023, photoinitiator, spacer particles 1021, nano scattering particles 1022 and liquid crystal 1024.

A percentage of the polymerized monomer 1023 in the polymer dispersed liquid crystal composition is about 5 wt %~30 wt %.

A percentage of the photoinitiator in the polymer dispersed liquid crystal composition is about 0.05 wt % to 3 wt %.

A percentage of the spacer particles 1021 in the polymer dispersed liquid crystal composition is about 0.8 wt % to 2 wt %. A diameter of the spacer particles is in a range of 10 micrometers to 50 micrometers.

A percentage of the nano scattering particles 1022 in the polymer dispersed liquid crystal composition is about 0.1 wt % to 2 wt %.

A percentage of the liquid crystal 1024 in the polymer dispersed liquid crystal composition is about 69 wt % to 90 wt %.

In this embodiments of the present disclosure, structures of the switchable diffuser is improved, thereby reducing its driving voltage required for transition from a transparent state to a scattered state.

According to one embodiment of the present disclosure, the switchable diffuser includes a first substrate, a second substrate disposed opposite to the first substrate, a first driving electrode disposed on an inner surface of the first substrate, a second driving electrode disposed on an inner surface of the second substrate, and a polymer dispersed liquid crystal film disposed between the first driving electrode and the second driving electrode.

The polymer dispersed liquid crystal film is made by polymerizing and curing a polymer dispersed liquid crystal composition. The polymer dispersed liquid crystal composition includes: polymerized monomer, photoinitiator, spacer particles, nano scattering particles and liquid crystal.

The polymerized monomer can undergo a polymerization reaction under action of the photoinitiator to form a polymer, which has a fixed effect on orientation of the liquid crystal. The polymerized monomer may be polyacrylate with double bond and its derivatives, such as hydroxypropyl acrylate, hydroxypropyl methacrylate, isobornyl methacrylate, 1,6-hexanediol diacrylate, 3,3,5-trimethylcyclohexyl acrylate.

The percentage of the polymerized monomer in the polymer dispersed liquid crystal composition is about 5 wt %~30 wt %. Optionally, the percentage of the polymerized monomer in the polymer dispersed liquid crystal composition is about 5 wt % to 20 wt %. More optionally, the percentage of the polymerized monomer in the polymer dispersed liquid crystal composition is about 5 wt % to 10 wt %. The percentage content of the polymerized monomer affects the degree of cross-linking. In one embodiment of the present disclosure, by reducing the content of polymerized monomer, the degree of crosslinking in the formed polymer dispersed liquid crystal film is reduced, thereby reducing a driving voltage required by the switchable diffuser for transition from a transparent state to a scattered state. When the percentage of the polymerized monomer in the polymer dispersed liquid crystal composition is about 5 wt % to 10 wt %, an optimal degree of cross-linking can be achieved, and the driving voltage required by the switchable diffuser for state transition is minimum.

In conjunction with this, in one embodiment of the present disclosure, the spacer particles with a diameter of 10 micrometers to 50 micrometers may be selected. Optionally, the spacer particles have a diameter of 11 micrometers to 20 micrometers. The decrease in the diameter of the spacer particles is conducive to reducing the driving voltage required by the switchable diffuser for transition from the scattering state to the transparent state. Particularly, when the diameter of the spacer particles is 11 micrometers to 20 micrometers, an optimal driving voltage may be realized.

The spacer particles may be nano glass microspheres. The percentage of the spacer particles in the polymer dispersed liquid crystal composition is 0.8 wt % to 2 wt %. Optionally, the percentage of the spacer particles in the polymer dispersed liquid crystal composition is 1 wt % to 2 wt %. More optionally, the percentage of the spacer particles in the polymer dispersed liquid crystal composition is 1.5 wt % to 2 wt %, thereby improving anti-extrusion ability of the diffuser.

The photoinitiator is used to initiate polymerization of polymerized monomers under ultraviolet light conditions. The photoinitiator may include, but not limited to, IR651, IR184, and the like. The percentage of the photoinitiator in the polymer dispersed liquid crystal composition is 0.05 wt % to 3 wt %. Optionally, the percentage of the photoinitiator in the polymer dispersed liquid crystal composition is 0.1 wt % to 1 wt %.

The liquid crystal may be obtained by mixing liquid crystal monomers, such as nematic liquid crystal. In order to improve the high temperature resistance of the switchable diffuser, a clearing point of the liquid crystal may be greater than or equal to 70° C., or greater than 100° C. If the conventional liquid crystal with a low clearing point is used, the polymer dispersed liquid crystal film is easy to be permanently damaged, and then the state switching between the transparent state and the scattered state cannot be achieved. In one embodiment of the present disclosure, liquid crystals with a clearing point greater than or equal to 70° C., or even greater than or equal to 100° C., are used, thereby ensuring that the polymer dispersed liquid crystal film of the switchable diffuser can still maintain original working state under heating conditions. The percentage of the liquid crystal in the polymer dispersed liquid crystal composition is 69 wt % to 90 wt %.

In order to avoid the reduction of the light scattering effect caused by the addition of small-diameter spacer particles, optionally, the polymer dispersed liquid crystal film further includes nano scattering particles. The percentage of the nano scattering particles in the polymer dispersed liquid crystal composition is 0.1 wt % to 2 wt %. The nano scattering particles generate a scattering effect inside the polymer dispersed liquid crystal film, thereby improving a scattering rate without affecting the driving voltage.

The nano scattering particles may be silica nanoparticles. The Silica nanoparticles have good scattering effect, and can cooperate with the spacer particles to improve the scattering rate, thereby compensating for the influence caused by the decrease in the diameter of the spacer particles.

In actual production, the switchable diffuser is easily deformed after being squeezed, thereby adversely affecting the assembly and display quality of a backlight module and even a display device.

In order to overcome this defect, in one embodiment of the present disclosure, optionally, the material of the substrate in the switchable diffuser is improved. The hardness of the substrate may be greater than or equal to H-grade. Optionally, the substrate may be made of polyimide having a hardness greater than or equal to H-grade. Further, in one embodiment of the present disclosure, the content of the spacer particles is increased to further improve the anti-extrusion performance of the switchable diffuser.

Figure 2:
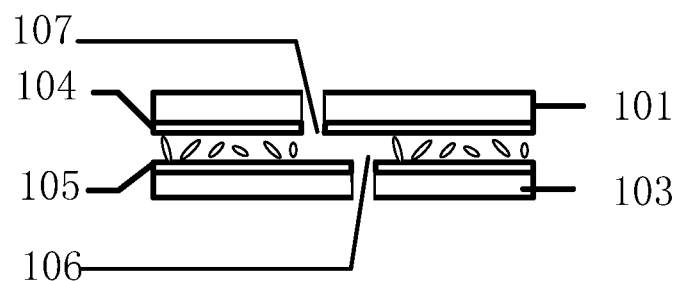
FIG. 2 is a schematic cross-sectional view of a switchable diffuser according to an embodiment of the present disclosure.
Figure 3:
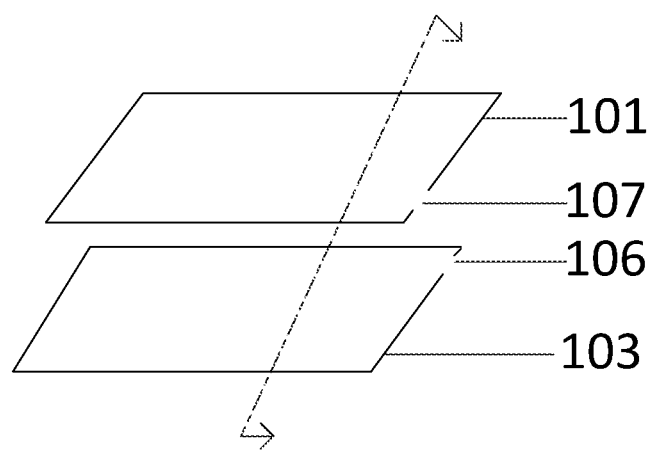
FIG. 3 is a top view of a switchable diffuser according to an embodiment of the present disclosure.

In order to connect the switchable diffuser to a power supply, optionally, referring to FIG. 2 and FIG. 3, the switchable diffuser includes a first preset region 106 and a second preset region 107. In the first preset region 106, only the first driving electrode 104 and the first substrate 101 are reserved for connection with the power supply.

In the second preset region 107, only the second driving electrode 105 and the second substrate 103 are reserved for connection with the power supply.

The first preset region 106 and the second preset region 107 may be located on the same side of the switchable diffuser.

When the first preset region and the second preset region are located on the same side of the switchable diffuser, the routing direction is the simplest, which helps reduce unnecessary leads.

FIG. 2 is a cross-sectional view taken along a dashed line in FIG. 3.

Figure 4:
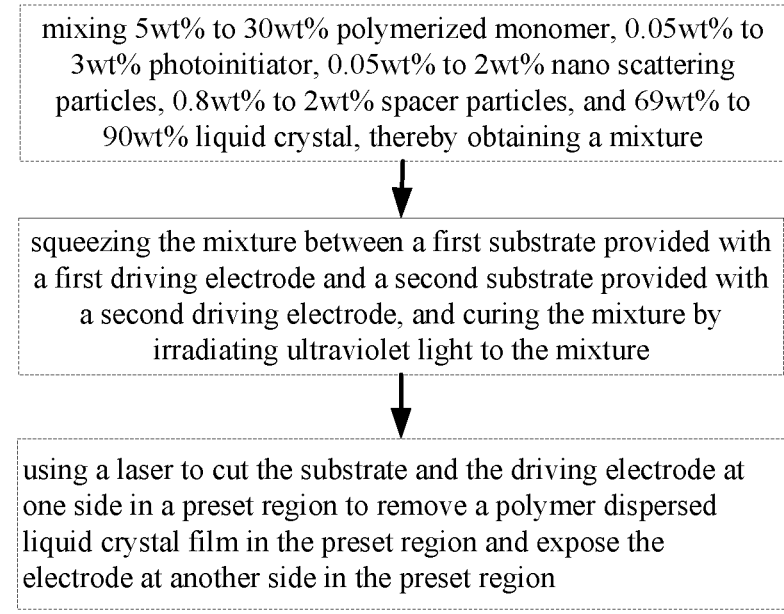
FIG. 4 is a flowchart of a method for manufacturing a switchable diffuser according to an embodiment of the present disclosure.

Referring to FIG. 4, one embodiment of the present disclosure provides a method for manufacturing the switchable diffuser, which includes the following steps:

mixing 5 wt % to 30 wt % polymerized monomer, 0.05 wt % to 3 wt % photoinitiator, 0.05 wt % to 2 wt % nano scattering particles, 0.8 wt % to 2 wt % spacer particles, and 69 wt % to 90 wt % liquid crystal, thereby obtaining a mixture; where a diameter of the spacer particles is 10 microns to 50 microns;

squeezing the mixture between a first substrate provided with a first driving electrode and a second substrate provided with a second driving electrode, and curing the mixture by irradiating ultraviolet light to the mixture, thereby forming a switchable diffuser.

Optionally, ultraviolet light irradiation time may be 5 minutes to 10 minutes.

Optionally, the method further includes:

using a laser to cut the second substrate and the second driving electrode in a first preset region to remove a polymer dispersed liquid crystal film in the first preset region and expose the first driving electrode in the first preset region;

using a laser to cut the first substrate and the first driving electrode in a second preset region to remove the polymer dispersed liquid crystal film in the second preset region and expose the second driving electrode in the second preset region; where the first preset region and the second preset region are located on the same side of the switchable diffuser.

The same side refers to any side of the switchable diffuser, as long as the two preset regions are on an identical side of the switchable diffuser. The two preset regions may be on the left side of the switchable diffuser, or the two preset regions may be on the right side of the switchable diffuser. Such an arrangement can save unnecessary leads as much as possible and make connection easier.

Figure 5:
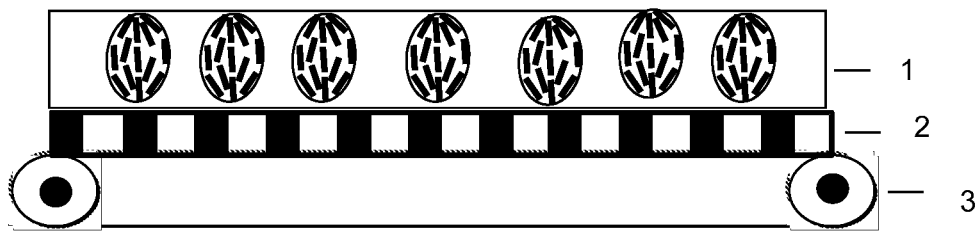
FIG. 5 is a schematic view of a backlight module according to an embodiment of the present disclosure.

One embodiment of the present disclosure provides a backlight module. As shown in FIG. 5, the backlight module includes a backlight 3, a light directing film 2, and the switchable diffuser 1 according to the foregoing technical solution. The backlight 3, the light directing film 2, and the switchable diffuser 1 are arranged in sequence.

In this embodiments of the present disclosure, structures of the switchable diffuser is improved, thereby reducing its driving voltage required for transition from a transparent state to a scattered state.

In one embodiment of the present disclosure, the backlight 3 is a component constituting the backlight module, such as a light source, a light guide plate, an optical film, for providing backlight. The light directing film 2 is used to redirect light provided by the backlight 3, and cooperates with the switchable diffuser 1 to complete the switch between narrow viewing angle display and wide viewing angle display.

Optionally, the light directing film 2 has a plurality of light-blocking walls arranged in parallel. There is a light transmission area between any two adjacent light-blocking walls. Each lateral side of each light-blocking wall facing its corresponding light transmission area is a light-blocking surface. Under action of the light directing film, the light provided by the backlight can be redirected in a predetermined area, and the light is usually limited to a narrow area.

When no voltage is applied to the switchable diffuser, the switchable diffuser is in a scattering state, and has a scattering effect on light passing through the light directing film, so that the light is converted into non-directional light, thereby achieving a wide viewing angle display.

When a voltage is applied to the switchable diffuser, the switchable diffuser is in a transmissive state and does not change propagation paths of light. The light directed by the light directing film is still limited to a narrow area, thereby achieving a narrow viewing angle display.

Figure 8:
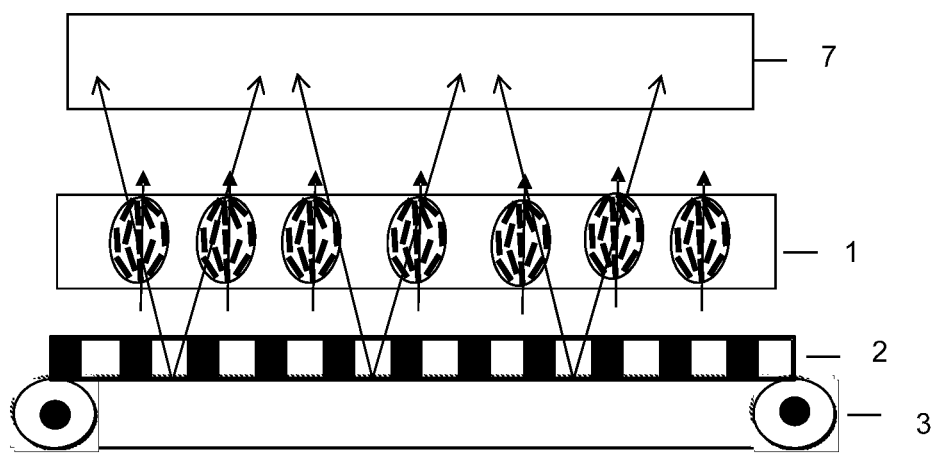
FIG. 8 is a schematic view showing a display device implementing a narrow viewing angle display according to an embodiment of the present disclosure.
Figure 9:
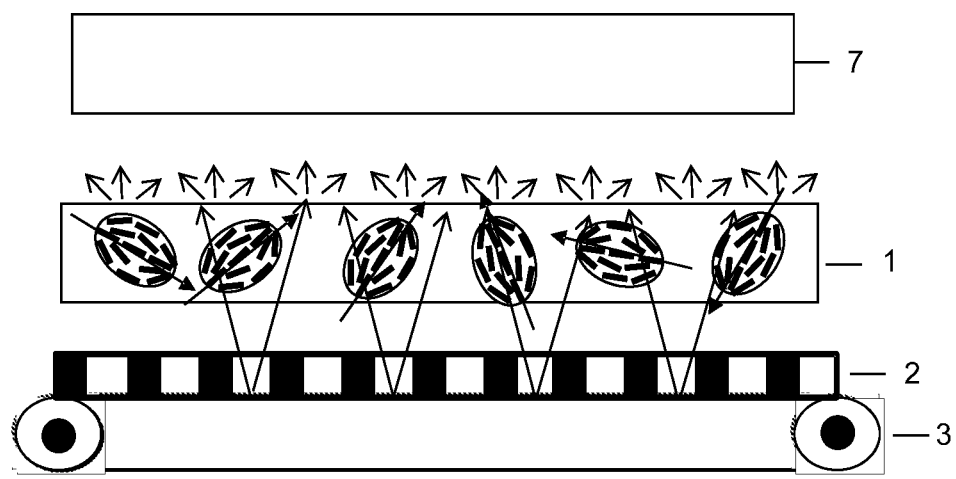
FIG. 9 is a schematic view showing a display device implementing a wide viewing angle display according to an embodiment of the present disclosure.

One embodiment of the present disclosure further provides a display device including a display panel 7 (as shown in FIG. 8 and FIG. 9) and the backlight module according to the above technical solution. The display panel is disposed at a light emitting side of the backlight module.

Figure 6:
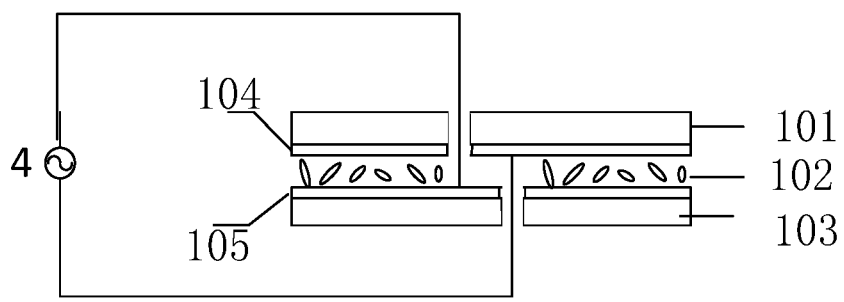
FIG. 6 is a schematic view showing connection between a switchable diffuser and an alternating current power supply in a display device according to an embodiment of the present disclosure.

Optionally, in the switchable diffuser of the backlight module, as shown in FIG. 6, a first driving electrode 104 and a second driving electrode 105 of the switchable diffuser are connected to an alternating current power supply 4, respectively.

Figure 7:
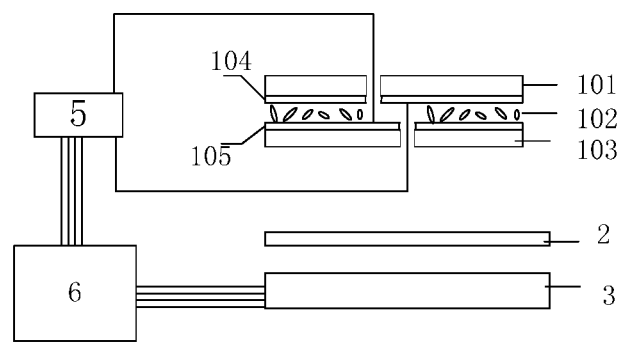
FIG. 7 is a schematic view showing connection between a switchable diffuser and a power management unit in a display device according to an embodiment of the present disclosure.

Optionally, in the switchable diffuser of the backlight module, as shown in FIG. 7, the first driving electrode 104 and the second driving electrode 105 of the switchable diffuser are connected to a flexible circuit board 5. The flexible circuit board 5 and the backlight source 3 are connected to an identical power management unit 6, thereby simplifying internal structures of the display device and saving costs.

The display device of the present disclosure can switch between a narrow viewing angle and a wide viewing angle, i.e., switching between anti-peeping display and normal display. Specific display state transitions are shown in FIG. 8 and FIG. 9.

As shown in FIG. 8, after the light emitted from the backlight 3 passes through the light directing film 2, incident angles of the light to the switchable diffuser 1 are limited. After the light passes through the switchable diffuser 1 which is in a transparent state after the driving voltage is applied, incident angles of the light to the display panel 7 are still limited, thereby achieving a narrow viewing angle display.

As shown in FIG. 9, after the light emitted from the backlight 3 passes through the light directing film 2, incident angles of the light to the switchable diffuser 1 are limited. After the light passes through the switchable diffuser 1 which is in a scattering state, incident light becomes uniform non-directional light, thereby achieving wide viewing angle display.

In summary, the backlight module in one embodiment of the present disclosure includes the backlight, the light directing film and the switchable diffuser which are arranged in sequence. The switchable diffuser can cooperate with the light directing film to switch between the narrow viewing angle and the wide viewing angle. The polymer dispersed liquid crystal film in the switchable diffuser reduces the content of monomer and increases the content of the liquid crystal material, thus the degree of cross-linking of the formed the polymer dispersed liquid crystal film is low. Therefore, the driving voltage required by the switchable diffuser for transition from a transparent state to a scattered state is reduced. Further, in one embodiment of the present disclosure, the spacer particles of smaller diameters are added, thereby further reducing the driving voltage required by the switchable diffuser for transition from the transparent state to the scattered state. Moreover, in one embodiment of the present disclosure, nano scattering particles are added to improve the scattering rate, thereby compensating for the influence caused by the decrease in the diameter of the spacer particles, which can further reduce the driving voltage and ensure the light scattering effect. Furthermore, in one embodiment of the present disclosure, a liquid crystal material with a relatively high clearing point is employed, thereby preventing the polymer dispersed liquid crystal film in the switchable diffuser from being damaged by the temperature, and improving the ability of the switchable diffuser to operate continuously under the condition of heat dissipation from the backlight. In addition, the content of the spacer particles are increased, thereby increasing the hardness of the substrate and then effectively improving the anti-extrusion performance of the switchable diffuser.

After experimental tests, the driving voltage of the switchable diffuser in one embodiment of the present disclosure is reduced from 60V to below 24V. When displaying at a narrow viewing angle, the light transmittance of the switchable diffuser is more than 70%, and optionally, more than 80%. When displaying at a wide viewing angle, the light transmittance of the switchable diffuser is less than 20%, and optionally, less than 10%. In one embodiment of the present disclosure, the displaying at a narrow viewing angle refers to providing a display area of −40 to 40° by taking a center of the display panel as the 0° standard line; and the displaying at a wide viewing angle refers to providing a display area of −85 to 85° by taking a center of the display panel as the 0° standard line.

When the display device in one embodiment of the present disclosure continuously operates for 10,000 hours or more, the display condition is normal, and it can still switch between a narrow viewing angle display and a wide viewing angle display. Further, the switchable diffuser can still maintain normal performance under the influence of the heat dissipation of the backlight, i.e., the transparent state and scattering state can be switched normally.

After the switchable diffuser in one embodiment of the present disclosure is squeezed, the deformation amount is less than 1%, and the product yield is high. After the diffuser in the related art is squeezed, the deformation amount is 5-10%, and such large deformation amount will affect the light path of the light. In addition, the large deformation amount of the diffuser in the related art will affect the service life of films and flatness of the films, and eventually affect the display effect and reduce the product yield.

Based on the reduction of the driving voltage of the switchable diffuser, in the display device of one embodiment of the present disclosure, the switchable diffuser and the backlight can share the same power management unit, which further simplifies the internal structures of the display device and saves costs.

It should be noted that the embodiments in this specification are described in a progressive manner. The same or similar parts between the embodiments can be referred to each other. Each embodiment focuses on differences from other embodiments. In particular, for the method embodiments, since they are basically similar to the product embodiments and thus the description thereof is relatively simple, and the relevant parts can be referred to the description of the product embodiments.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Such words as "comprises" or "include" mean that an element or object appearing before the word covers elements or objects listed after the word and their equivalents, but do not exclude other elements or objects. Similarly, such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

It will be understood that when an element such as a layer, film, region, or substrate is referred to as being "on" or "under" another element, this element may be "directly" on or "under" the other element, or, there may be an intermediate element therebetween.

In the description of the above embodiments, specific features, structures, materials or characteristics may be combined in any suitable manner in any one or more embodiments or examples.

The above are merely the embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure. The protection scope of the present disclosure shall be subject to the protection scope of the claims.

The invention claimed is:

1. A switchable diffuser comprising:
   a first substrate;
   a second substrate disposed opposite to the first substrate;
   a first driving electrode disposed on an inner surface of the first substrate;
   a second driving electrode disposed on an inner surface of the second substrate; and
   a polymer dispersed liquid crystal film disposed between the first driving electrode and the second driving electrode;
   wherein the polymer dispersed liquid crystal film is made of a polymer dispersed liquid crystal composition via polymerizing and curing; the polymer dispersed liquid crystal composition includes: polymerized monomer, photoinitiator, spacer particles, nano scattering particles and liquid crystal;
   a percentage of the polymerized monomer in the polymer dispersed liquid crystal composition is about 5 wt %~30 wt %;
   a percentage of the photoinitiator in the polymer dispersed liquid crystal composition is about 0.05 wt % to 3 wt %;
   a percentage of the spacer particles in the polymer dispersed liquid crystal composition is about 0.8 wt % to 2 wt %; a diameter of the spacer particles is in a range of 10 micrometers to 50 micrometers;
   a percentage of the nano scattering particles in the polymer dispersed liquid crystal composition is about 0.1 wt % to 2 wt %;
   a percentage of the liquid crystal in the polymer dispersed liquid crystal composition is about 69 wt % to 90 wt %.

2. The switchable diffuser according to claim 1, wherein a diameter of the spacer particles is in a range of 11 micrometers to 20 micrometers.

3. The switchable diffuser according to claim 1, wherein the nano scattering particles include silica nanoparticles.

4. The switchable diffuser according to claim 1, wherein a clearing point of the liquid crystal is greater than or equal to 70° C.

5. The switchable diffuser according to claim 1, wherein the percentage of the polymerized monomer in the polymer dispersed liquid crystal composition is 5 wt % to 10 wt %.

6. The switchable diffuser according to claim 1, wherein the switchable diffuser includes a first preset region and a second preset region; in the first preset region, only the first driving electrode and the first substrate are reserved for connecting to a power supply;
   in the second preset region, only the second driving electrode and the second substrate are reserved for connecting to the power supply;
   the first preset region and the second preset region are located at an identical side of the switchable diffuser.

7. A method for manufacturing a switchable diffuser, comprising:
   mixing 5 wt % to 30 wt % polymerized monomer, 0.05 wt % to 3 wt % photoinitiator, 0.05 wt % to 2 wt % nano scattering particles, 0.8 wt % to 2 wt % spacer particles, and 69 wt % to 90 wt % liquid crystal, thereby obtaining a mixture; wherein a diameter of the spacer particles is in a ragneg of 10 microns to 50 microns;

squeezing the mixture between a first substrate provided with a first driving electrode and a second substrate provided with a second driving electrode, and curing the mixture by irradiating ultraviolet light to the mixture, thereby forming the switchable diffuser.

8. The method according to claim 7, wherein the method further includes:
using a laser to cut the second substrate and the second driving electrode in a first preset region to remove a polymer dispersed liquid crystal film in the first preset region and expose the first driving electrode in the first preset region;
using a laser to cut the first substrate and the first driving electrode in a second preset region to remove a polymer dispersed liquid crystal film in the second preset region and expose the second driving electrode in the second preset region; wherein the first preset region and the second preset region are located at an identical side of the switchable diffuser.

9. A backlight module, comprising:
a backlight;
a light directing film; and
a switchable diffuser;
wherein the backlight, the light directing film and the switchable diffuser are arranged in sequence;
wherein the switchable diffuser includes:
a first substrate;
a second substrate disposed opposite to the first substrate;
a first driving electrode disposed on an inner surface of the first substrate;
a second driving electrode disposed on an inner surface of the second substrate; and
a polymer dispersed liquid crystal film disposed between the first driving electrode and the second driving electrode;
wherein the polymer dispersed liquid crystal film is made of a polymer dispersed liquid crystal composition via polymerizing and curing; the polymer dispersed liquid crystal composition includes: polymerized monomer, photoinitiator, spacer particles, nano scattering particles and liquid crystal;
a percentage of the polymerized monomer in the polymer dispersed liquid crystal composition is about 5 wt %~30 wt %;
a percentage of the photoinitiator in the polymer dispersed liquid crystal composition is about 0.05 wt % to 3 wt %;
a percentage of the spacer particles in the polymer dispersed liquid crystal composition is about 0.8 wt % to 2 wt %; a diameter of the spacer particles is in a range of 10 micrometers to 50 micrometers;
a percentage of the nano scattering particles in the polymer dispersed liquid crystal composition is about 0.1 wt % to 2 wt %;
a percentage of the liquid crystal in the polymer dispersed liquid crystal composition is about 69 wt % to 90 wt %.

10. The backlight module according to claim 9, wherein the light directing film includes a plurality of light-blocking walls arranged in parallel; there is a light transmission area between two adjacent light-blocking walls; each lateral side of each light-blocking wall facing a corresponding light transmission area is a light-blocking surface.

11. The backlight module according to claim 10, wherein the light directing film is located between the backlight and the switchable diffuser.

12. The backlight module according to claim 11, wherein the backlight includes a light guide plate; the light directing film is disposed on the light guide plate.

13. The backlight module according to claim 9, wherein a diameter of the spacer particles is in a range of 11 micrometers to 20 micrometers.

14. The backlight module according to claim 9, wherein the nano scattering particles include silica nanoparticles.

15. The backlight module according to claim 9, wherein a clearing point of the liquid crystal is greater than or equal to 70° C.

16. The backlight module according to claim 9, wherein the percentage of the polymerized monomer in the polymer dispersed liquid crystal composition is 5 wt % to 10 wt %.

17. The backlight module according to claim 9, wherein the switchable diffuser includes a first preset region and a second preset region; in the first preset region, only the first driving electrode and the first substrate are reserved for connecting to a power supply;
in the second preset region, only the second driving electrode and the second substrate are reserved for connecting to the power supply;
the first preset region and the second preset region are located at an identical side of the switchable diffuser.

18. A display device, comprising:
a display panel; and
the backlight module according to claim 9;
wherein the display panel is disposed at a light emitting side of the backlight module.

19. The display device according to claim 18, wherein the first driving electrode and the second driving electrode of the switchable diffuser in the backlight module are connected to a flexible circuit board;
the display device further includes a power management unit; the flexible circuit board and the backlight are connected to the power management unit.

20. The display device according to claim 18, wherein the display device further includes an alternating current power supply; the first driving electrode and the second driving electrode of the switchable diffuser in the backlight module are connected to the alternating current power supply.

* * * * *